United States Patent [19]

Elbracht

[11] Patent Number: 4,702,010

[45] Date of Patent: Oct. 27, 1987

[54] TESTING THE INTERNAL GEOMETRY OF TUBES AND PIPES

[75] Inventor: Kurt Elbracht, Ratingen, Fed. Rep. of Germany

[73] Assignee: Mannesmann AG, Duesseldorf, Fed. Rep. of Germany

[21] Appl. No.: 935,050

[22] Filed: Nov. 26, 1986

[30] Foreign Application Priority Data

Nov. 26, 1985 [DE] Fed. Rep. of Germany ....... 3542163

[51] Int. Cl.$^4$ ................................................. G01B 5/12
[52] U.S. Cl. .................................... 33/178 F; 33/544
[58] Field of Search ..................... 73/49.1; 33/DIG. 2, 33/178 R, 178 F, 1 H, 302, 544

[56] References Cited

U.S. PATENT DOCUMENTS

| | | | |
|---|---|---|---|
| 4,341,113 | 7/1982 | Gutzwiller | 33/302 X |
| 4,354,379 | 10/1982 | Miner | 33/DIG. 2 |
| 4,651,437 | 3/1987 | Khouly | 33/178 F X |

FOREIGN PATENT DOCUMENTS 1043643 11/1958 Fed. Rep. of Germany .... 33/178 F

Primary Examiner—Harry N. Haroian
Attorney, Agent, or Firm—Ralf H. Siegemund

[57] ABSTRACT

The internal geometry of tubes or pipes are tested by a measuring mandrel normally held in an adapter sleeve provided for end to end abutment with the tube or pipe to be tested; pressurized air is applied to the adapter sleeve to obtain the propelling of the measuring mandrel out of the adapter sleeve sleeve and into and through that tube or pipe; a tape, cable or rope is fastened to the mandrel and also wound on a drum to be unreeled therefrom as the mandrel is propelled through the tube or pipe to be tested; the drum is driven by a reversible drive operated for break operation tending to retard the mandrel and further provided for reversing permitting retraction of the mandrel back into the adapter sleeve after the pressure has been removed.

3 Claims, 1 Drawing Figure

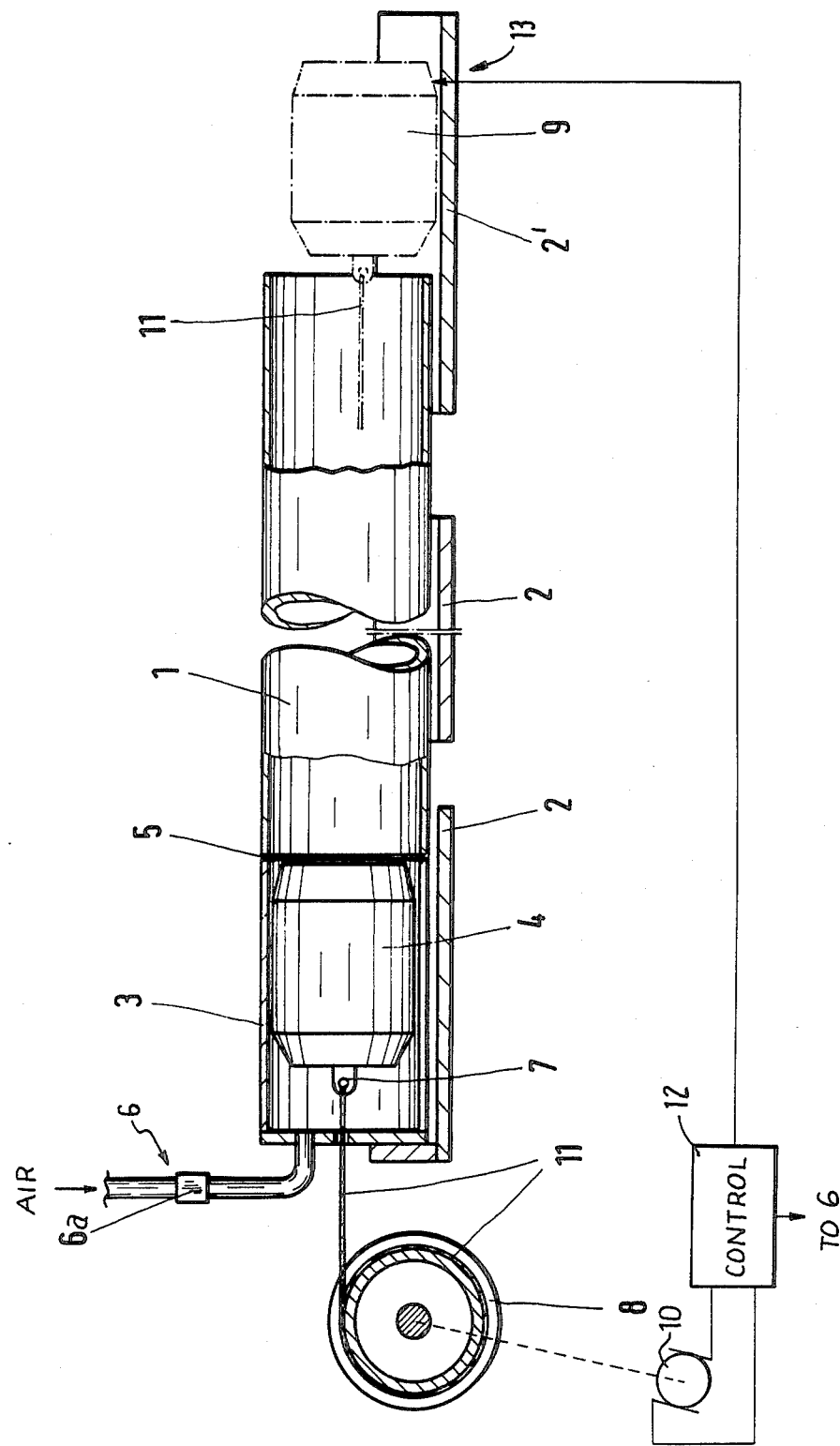

TESTING THE INTERNAL GEOMETRY OF TUBES AND PIPES

BACKGROUND OF THE INVENTION

The present invention relates to testing the internal geometry of tubes or pipes under utilization of a measuring mandrel-like probe movable through the tube or pipe by means of pneumatics and including a device connected to a source of pressurized air and being provided to receive the measuring mandrel to have the mandrel propelled through the tube or pipe to be tested.

Measuring the geometry of a tube or pipe under utilization of a measuring mandrel as mentioned requires that certain rules of the American Petroleum Institute are to be observed. The testing is made difficult by the fact that the testing period has to fit in the production cycle. Also, following the insertion of the measuring device into the tube or pipe from one end and catching it at the other end it must be in some way returned to a position for insertion into the next pipe which will assume a position just as the previous one had during say a continuous mode of production.

It has been suggested in U.S. Pat. No. 4,354,379 to provide a net at the exit end of the tube or pipe to capture the measuring mandrel in that fashion. But how the measuring mandrel is then to be returned is not detailed in that reference. In accordance with another proposal it is suggested to capture the mandrel by means of a cushioning device when it is still at least in parts in the tube or pipe. Through suction the mandrel is then returned back to its launching station. This proposal is disadvantaged by the fact that the advance of the measuring mandrel is very nonuniform. Moreover, should for some reason a measuring mandrel get caught in the interior of a tube namely because the tube has two small an inner diameter, one has to remove the tube from the test stand and push the mandrel out of the tube by means of rods or the like because pneumatics cannot be expected to work anymore once the mandrel is stuck.

DESCRIPTION OF THE INVENTION

It is an object of the present invention to provide a new and improved method and equipment for checking the internal geometry of the tube or pipe by means of a measuring mandrel whereby the aforementioned difficulties are avoided.

It is a particular object of the present invention to improve a method of checking the internal geometry of a tube or pipe by means of a pneumatically moved mandrel, by providing specifically a more uniform travel on one hand and by providing specific steps for a definite return of the mandrel following traversal of the tube.

In accordance with the preferred embodiment of the present invention it is suggested to provide an adaptor sleeve as it is known per se and position it in a test station such that the sleeve will abut the tube or pipe to be tested; the sleeve is a launching station and contains a measuring mandrel held with one end of a tape, cable, rope or the like to be wound on an external drum; the drum being driven by a reversible motor and will vary between breaking operation when pressurized air propels the mandrel out of the adapter into and through the tube while at the end of a measuring run or after the mandrel has become stuck in a tube the mandrel is retracted by the reversing the motor so that the drum and cable can pull the mandrel back. At the other exit of the tube a capturing trough is provided on which the mandrel comes to rest after having propagated through the tube or pipe to be measured.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates a partial cross section and side elevation of a tube or pipe checking and testing equipment in accordance with the preferred embodiment of the present invention for practicing the best mode thereof.

Proceeding now to the detailed description of the drawings the FIGURE illustrates a tube or pipe 1 placed in a trough or raillike device or container 2 to thereby establish a test position and station. All parts shown to the left of the pipe or tube in the drawing pertain to the adapter station by means of which a measuring mandrel 4 is moved through a tube or pipe 1 to be tested. This station includes primarily an adapter sleeve 3 abutting the test tube 1 in end face-to-end face relation in an area 5. The adapter sleeve 3 can be seen as the basic housing for the measuring mandrel 4. The area 5 does not, however, have to be air tightly sealed. Basically two kinds of positionings are possible. One can keep the adapter 3 basically in that measuring location defined by trough 2 and shift the tube 1 against sleeve 3 or the tube 1 is somehow clamped first to the measuring location (trough 2) and the adapter sleeve then is shifted against it. The adapter 3 and the mandrel 4 are to be used for each measurement to be carried out.

The adapter sleeve 3 is provided at its rear end with a connection 6 leading to a source of pressurized air. That source is not illustrated. Generally speaking the inlet tubes for connection 6 provides for feeding of pressurized air into the adapter 3. Reference numeral 6a denotes a valve by means of which the flow of air can be controlled. The source has to produce a quantity of pressurized air, depending upon the compression that is available and the volume of the tubes to be tested whereby of course in between two test cycles the pressure in the source must be replenished. The available pressure force that is needed must be such that the mandrel 4 can be propelled through the tube 1 and what is needed specifically is a force sufficient to overcome the regular friction force that the mandrel 4 will encounter upon passage through a tube 1. There are certain rules limiting the amount of pressure force that is used because it has to be avoided to propel the mandrel 4 with, so to speak, brute force through the tube 1. The mandrel 4 is a measuring device and not a sizing tool. By and large a pressure of 300 to 500 mm water column is needed, required and desired.

Of course it has to be considered that the various tubes that have to be tested offer different degrees of friction against the mandrel passing through. Also pressurized air is after all a highly compressible fluid so that both factors together may cause a rather ununiform propulsion speed of the mandrel 4 through any of the tubes 1. Hence the force actually in each instance upon the mandrel 4 may be more or less unpredictable and varies in accordance with required accelaration forces by the mandrel itself. In order to avoid irregularities on that account the invention proposes to include a cable or 11 wound on tape spool 8 in the mandrel station and having one end fastened to an eye 7 or the mandrel 4. The drum 8 is driven by a suitable motor such as a reversible d.c. motor 10. The motor is controlled by a control and switching circuit 12.

As the source of pressurized air is connected by valve 6 to adapter sleeve 3 testing begins by having the mandrel 4 propelled into and through tube 1. At the same time the cable or tape 11 runs uniformly off the drum 8 thereby imparting a uniform speed upon the mandrel 4. This operation is specifically the result of braking by motor 8. A constant current will ensure a constant torque and uniform speed. The propulsion of the mandrel 4 is thus obtained through the pressurized air while the tape or cable 11 limits the resulting motion of the mandrel 4 and ensures uniformity thereof. The measuring mandrel 4 thus moves at a constant speed away from the adapter 3 into the tube 1.

Reference numeral 9 indicates the position of the mandrel following emergence from the other end of the tube 1 the mandrel has been captured by a trough 2'. As the mandrel 4 has reached that positioned 9 it has in fact not encountered any obstacle inside of the tube. A switch 13 may be operated which then in a conventional manner, e.g. via control 12, turns off the flow of pressurized air into 6. Simultanously however the drive 10 of the drum is acted upon by the control 12 causing the drive to reverse. Instead of the switch 13 one may use a switch that is operated at any point that is convenient by the cable or tape 11. Conceivably the switch may be on the drum 8 itself and as a particular loop of the tape or cable 11 is taken off the drum the switch is actuated. After the reversal of motor 10 the plug 4 is simply pulled back through the tube by the cable or tape 11, the reversing drum 8 and the drive 10,12. Should accidentally during the test the mandrel 4 become stuck in too tight a tube 1 then the static pressure behind the mandrel 4 may be insufficient to further propel the mandrel through the tube and to overcome that obstacle. This means that the cable or tape 11 will fall slack and the drive actually changes over from breaking operation to idling. This in fact amounts to a reversal in electric current direction in the drive motor 10. A monitoring switch or transducer will respond and the control 23 will reverse so that the mandrel 4 is now pulled back by means of the cable or tape 11 and the reversal of drum motor 10.

Conceivably one may introduce a lag into the control in order to have the system stabilized and only after the delay has run the retraction of the mandrel obtains. Provided the cable or tape 11 is sufficiently strong the removal of the mandrel 4 from the stuck position can be guaranteed. That removal is no longer dependant upon any kind of suction as in the case of the state of the art.

On the other hand the available pressure force in conjunction with the previously obtained breaking action under consideration of the mass of the mandrel 4 means that at a given speed the wedging force by means of which the mandrel 4 actually become stuck in the tube 1 is limited. The degree of binding is thus limited, so that the maximum force needed to pull the mandrel 4 back is readily predictable and that determines the power of the motor 10 on one hand and the strength of the able or tape 11 on the other hand. The mandrel will always be pulled back into the adapter sleeve 3 permitting sorting out the defective pipe, but it is avoided that upon removal of the tube the mandrel is still stuck. As the defective pipe or tube is removed the device is ready again for the next test run so that the overall production cycle is not interrupted. It is of course conceivable that within a given system several mandrels and test stands of the type described are used. However experience has shown that this is not necessary a single station with a single mandrel suffices.

The invention is not limited to the embodiments described above but all changes and modifications thereof not constituting departures from the spirit and scope of the invention are intended to be included.

I claim:

1. Apparatus for testing the internal geometry of tubes or pipes being placed in a particular test station comprising:
    an adapter sleeve provided for end to end abutment with the tube or pipe to be tested and containing removably a measuring mandrel to be propelled through the tube or pipe to be tested;
    means for applying pressurized air to said adapter sleeve to obtain a propelling of said measuring mandrel out of the adapter sleeve and into and through that tube or pipe;
    a tape, cable or rope fastened to said mandrel and being wound on a drum to be unreeled therefrom as the mandrel is propelled through the tube or pipe to be tested;
    reversible drive means connected to the drum and operated for brake operation tending to retard said mandrel upon being propelled through said tube or pipe to be tested without impeding propagation of the mandrel through the tube or pipe to be tested and further provided for reversing permitting retraction of the mandrel through the tube or pipe back into the adapter sleeve; and
    switch means for disconnecting the pressure source from the adaptor sleeve.

2. Apparatus as in claim 1, including switch means connected for reversing the drive means at the end of a test cycle.

3. Apparatus as in claim 1 and including a capturing trough at the other end of the tube or pipe.

* * * * *